US012677073B2

(12) United States Patent
Fujisawa et al.

(10) Patent No.: US 12,677,073 B2
(45) Date of Patent: Jul. 7, 2026

(54) DETECTION DEVICE USING THRESHOLD

(71) Applicant: Magnolia White Corporation, Tokyo (JP)

(72) Inventors: Akihiko Fujisawa, Tokyo (JP); Kaoru Ito, Tokyo (JP); Daichi Abe, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 63 days.

(21) Appl. No.: 18/672,934

(22) Filed: May 23, 2024

(65) Prior Publication Data

US 2024/0397219 A1      Nov. 28, 2024

(30) Foreign Application Priority Data

May 24, 2023      (JP) ................................. 2023-085628

(51) Int. Cl.
| | |
|---|---|
| *H04N 25/47* | (2023.01) |
| *H04N 23/56* | (2023.01) |
| *H04N 25/60* | (2023.01) |
| *H04N 25/78* | (2023.01) |

(52) U.S. Cl.
CPC ............. *H04N 25/47* (2023.01); *H04N 23/56* (2023.01); *H04N 25/60* (2023.01); *H04N 25/78* (2023.01)

(58) Field of Classification Search
CPC ........ H04N 25/47; H04N 25/60; H04N 25/78; H04N 23/56; G05B 2219/37208
See application file for complete search history.

(56) References Cited

U.S. PATENT DOCUMENTS

| | | | | |
|---|---|---|---|---|
| 10,852,183 B2* | 12/2020 | Nishihara | ........... | G01T 1/20184 |
| 2018/0328783 A1* | 11/2018 | Nishihara | ............ | H04N 25/618 |
| 2023/0045152 A1* | 2/2023 | Saliu | ........................ | G06T 7/70 |

FOREIGN PATENT DOCUMENTS

JP      2018033430 A      3/2018

* cited by examiner

*Primary Examiner* — Nicholas G Giles
(74) *Attorney, Agent, or Firm* — K&L Gates LLP

(57)      ABSTRACT
A detection device includes a planar detection device comprising a plurality of photodetection elements arranged in a planar configuration, a light source device disposed so as to face the planar detection device, and a light-transmitting mounting substrate that is disposed between the planar detection device and the light source device and configured to mount a plurality of objects to be detected.

16 Claims, 18 Drawing Sheets

AA

| 0.06 | 0.10 | 0.15 | 0.20 | 0.24 | 0.25 | 0.24 | 0.20 | 0.15 | 0.10 | 0.06 |
| 0.10 | 0.17 | 0.25 | 0.33 | 0.39 | 0.41 | 0.39 | 0.33 | 0.25 | 0.17 | 0.10 |
| 0.15 | 0.25 | 0.37 | 0.49 | 0.57 | 0.61 | 0.57 | 0.49 | 0.37 | 0.25 | 0.15 |
| 0.20 | 0.33 | 0.49 | 0.64 | 0.76 | 0.80 | 0.76 | 0.64 | 0.49 | 0.33 | 0.20 |
| 0.24 | 0.39 | 0.57 | 0.76 | 0.89 | 0.95 | 0.89 | 0.76 | 0.57 | 0.39 | 0.24 |
| 0.25 | 0.41 | 0.61 | 0.80 | 0.95 | 1.00 | 0.95 | 0.80 | 0.61 | 0.41 | 0.25 |
| 0.24 | 0.39 | 0.57 | 0.76 | 0.89 | 0.95 | 0.89 | 0.76 | 0.57 | 0.39 | 0.24 |
| 0.20 | 0.33 | 0.49 | 0.64 | 0.76 | 0.80 | 0.76 | 0.64 | 0.49 | 0.33 | 0.20 |
| 0.15 | 0.25 | 0.37 | 0.49 | 0.57 | 0.61 | 0.57 | 0.49 | 0.37 | 0.25 | 0.15 |
| 0.10 | 0.17 | 0.25 | 0.33 | 0.39 | 0.41 | 0.39 | 0.33 | 0.25 | 0.17 | 0.10 |
| 0.06 | 0.10 | 0.15 | 0.20 | 0.24 | 0.25 | 0.24 | 0.20 | 0.15 | 0.10 | 0.06 |

Dy

Dz  Dx

AA

| 16.1 | 9.75 | 6.61 | 5.01 | 4.24 | 4.01 | 4.24 | 5.01 | 6.61 | 9.75 | 16.1 |
|------|------|------|------|------|------|------|------|------|------|------|
| 9.75 | 5.92 | 4.01 | 3.04 | 2.57 | 2.43 | 2.57 | 3.04 | 4.01 | 5.92 | 9.75 |
| 6.61 | 4.01 | 2.72 | 2.06 | 1.74 | 1.65 | 1.74 | 2.06 | 2.72 | 4.01 | 6.61 |
| 5.01 | 3.04 | 2.06 | 1.56 | 1.32 | 1.25 | 1.32 | 1.56 | 2.06 | 3.04 | 5.01 |
| 4.24 | 2.57 | 1.74 | 1.32 | 1.12 | 1.06 | 1.12 | 1.32 | 1.74 | 2.57 | 4.24 |
| 4.01 | 2.43 | 1.65 | 1.25 | 1.06 | 1.00 | 1.06 | 1.25 | 1.65 | 2.43 | 4.01 |
| 4.24 | 2.57 | 1.74 | 1.32 | 1.12 | 1.06 | 1.12 | 1.32 | 1.74 | 2.57 | 4.24 |
| 5.01 | 3.04 | 2.06 | 1.56 | 1.32 | 1.25 | 1.32 | 1.56 | 2.06 | 3.04 | 5.01 |
| 6.61 | 4.01 | 2.27 | 2.06 | 1.74 | 1.65 | 1.74 | 2.06 | 2.72 | 4.01 | 6.61 |
| 9.75 | 5.92 | 4.01 | 3.04 | 2.57 | 2.43 | 2.57 | 3.04 | 4.01 | 5.92 | 9.75 |
| 16.1 | 9.75 | 6.61 | 5.01 | 4.24 | 4.01 | 4.24 | 5.01 | 6.61 | 9.75 | 16.1 |

Dy

Dz  Dx

AA

| 10 | 9 | 8 | 8 | 7 | 7 | 7 | 8 | 8 | 9 | 10 |
|----|---|---|---|---|---|---|---|---|---|----|
| 9 | 8 | 7 | 6 | 6 | 5 | 6 | 6 | 7 | 8 | 9 |
| 8 | 7 | 6 | 5 | 4 | 3 | 4 | 5 | 6 | 7 | 8 |
| 8 | 6 | 5 | 3 | 2 | 2 | 2 | 3 | 5 | 6 | 8 |
| 7 | 6 | 4 | 2 | 1 | 1 | 1 | 2 | 4 | 6 | 7 |
| 7 | 5 | 3 | 2 | 1 | 1 | 1 | 2 | 3 | 5 | 7 |
| 7 | 6 | 4 | 2 | 1 | 1 | 1 | 2 | 4 | 6 | 7 |
| 8 | 6 | 5 | 3 | 2 | 2 | 2 | 3 | 5 | 6 | 8 |
| 8 | 7 | 6 | 5 | 4 | 3 | 4 | 5 | 6 | 7 | 8 |
| 9 | 8 | 7 | 6 | 6 | 5 | 6 | 6 | 7 | 8 | 9 |
| 10 | 9 | 8 | 8 | 7 | 7 | 7 | 8 | 8 | 9 | 10 |

Dy

Dz Dx

AA

| 0.45 | 0.43 | 0.40 | 0.37 | 0.35 | 0.34 | 0.35 | 0.37 | 0.40 | 0.43 | 0.45 |
| 0.43 | 0.39 | 0.34 | 0.29 | 0.26 | 0.25 | 0.26 | 0.29 | 0.34 | 0.39 | 0.43 |
| 0.40 | 0.34 | 0.28 | 0.23 | 0.21 | 0.20 | 0.21 | 0.23 | 0.28 | 0.34 | 0.40 |
| 0.37 | 0.29 | 0.23 | 0.19 | 0.16 | 0.15 | 0.16 | 0.19 | 0.23 | 0.29 | 0.37 |
| 0.35 | 0.26 | 0.21 | 0.16 | 0.15 | 0.15 | 0.15 | 0.16 | 0.21 | 0.26 | 0.35 |
| 0.34 | 0.25 | 0.20 | 0.15 | 0.15 | 0.15 | 0.15 | 0.15 | 0.20 | 0.25 | 0.34 |
| 0.35 | 0.26 | 0.21 | 0.16 | 0.15 | 0.15 | 0.15 | 0.16 | 0.21 | 0.26 | 0.35 |
| 0.37 | 0.29 | 0.23 | 0.19 | 0.16 | 0.15 | 0.16 | 0.19 | 0.23 | 0.29 | 0.37 |
| 0.40 | 0.34 | 0.28 | 0.23 | 0.21 | 0.20 | 0.21 | 0.23 | 0.28 | 0.34 | 0.40 |
| 0.43 | 0.39 | 0.34 | 0.29 | 0.26 | 0.25 | 0.26 | 0.29 | 0.34 | 0.39 | 0.43 |
| 0.45 | 0.43 | 0.40 | 0.37 | 0.35 | 0.34 | 0.35 | 0.37 | 0.40 | 0.43 | 0.45 |

Dy

Dz  Dx

DETECTION DEVICE USING THRESHOLD

CROSS-REFERENCE TO RELATED APPLICATION

This application claims the benefit of priority from Japanese Patent Application No. 2023-085628 filed on May 24, 2023, the entire contents of which are incorporated herein by reference.

BACKGROUND

1. Technical Field

The present disclosure relates to a detection device.

2. Description of the Related Art

Methods for distinguishing microorganisms with a lens-less imaging system using a photosensor have been disclosed (for example, Japanese Patent Application Laid-open Publication No. 2018-033430 (JP-A-2018-033430)). In a lens-less imaging system of JP-A-2018-033430, light emitted from a point light source passes through a culture medium in a culture vessel and a colony of microorganisms such as bacteria (object to be detected) on the culture medium, and enters a photosensor. The photosensor acquires colony formation images (scattered light patterns) of the microorganisms as pixel data.

In such a lens-less imaging system, the intensity of the amount of light received by each detection element (hereinafter, also referred to as "received light intensity") varies depending on the relative positional relation with the point light source. Therefore, for example, it is conceivable to correct the pixel data according to the received light intensity, but system-derived noise components included in the pixel data may be amplified to cause false detection.

It is an object of the present disclosure to provide a detection device capable of reducing the effects of the system-derived noise components.

SUMMARY

A detection device according to an embodiment of the present disclosure includes a planar detection device comprising a plurality of photodetection elements arranged in a planar configuration, a light source device disposed so as to face the planar detection device, and a light-transmitting mounting substrate that is disposed between the planar detection device and the light source device and configured to mount a plurality of objects to be detected. The planar detection device includes a detection area in which a plurality of sensor pixels comprising the photodetection elements are arranged in a first direction and a second direction orthogonal to the first direction, a detection circuit configured to acquire a sensor value of each of the sensor pixels, and a control circuit configured to, when a number of times that a value calculated based on the sensor value is consecutively equal to or higher than a determination threshold is equal to or higher than a consecutive determination count threshold that has been set according to a received light intensity for each of the sensor pixels, determine that an object to be detected is present in a position on the detection area corresponding to the sensor pixel.

A detection device according to an embodiment of the present disclosure includes a planar detection device comprising a plurality of photodetection elements arranged in a planar configuration, a light source device disposed so as to face the planar detection device, and a light-transmitting mounting substrate that is disposed between the planar detection device and the light source device and configured to mount a plurality of objects to be detected. The planar detection device includes a detection area in which a plurality of sensor pixels comprising the photodetection elements are arranged in a first direction and a second direction orthogonal to the first direction, a detection circuit configured to acquire a sensor value of each of the sensor pixels, and a control circuit configured to, when a value calculated based on the sensor value is equal to or higher than a determination threshold that has been set according to a received light intensity for each of the sensor pixels, determine that an object to be detected is present in a position on the detection area corresponding to the sensor pixel.

DETAILED DESCRIPTION

Figure 1:
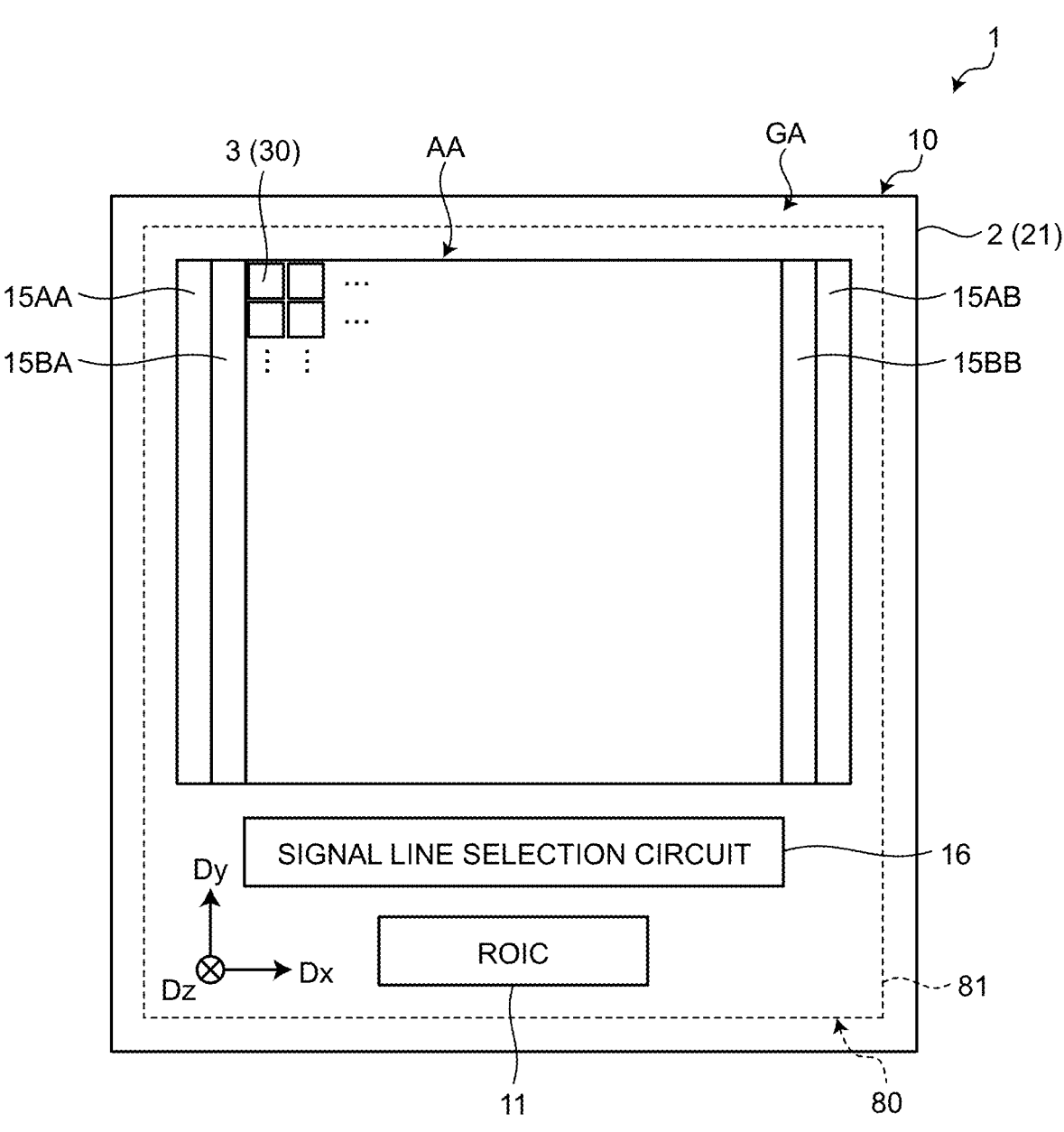
FIG. 1 is a plan view schematically illustrating a detection device according to an embodiment of the present disclosure.

The following describes modes (embodiments) for carrying out the present disclosure in detail with reference to the drawings. The present disclosure is not limited to the description of the embodiments to be given below. Components to be described below include those easily conceivable by those skilled in the art or those substantially identical thereto. In addition, the components to be described below can be combined as appropriate. What is disclosed herein is merely an example, and the present disclosure naturally encompasses appropriate modifications easily conceivable by those skilled in the art while maintaining the gist of the present disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In the present specification and claims, in expressing an aspect of disposing another structure above a certain structure, a case of simply expressing "above" includes both a case of disposing the other structure immediately above the certain structure so as to contact the certain structure and a case of disposing the other structure above the certain structure with still another structure interposed therebetween, unless otherwise specified.

Figure 2:
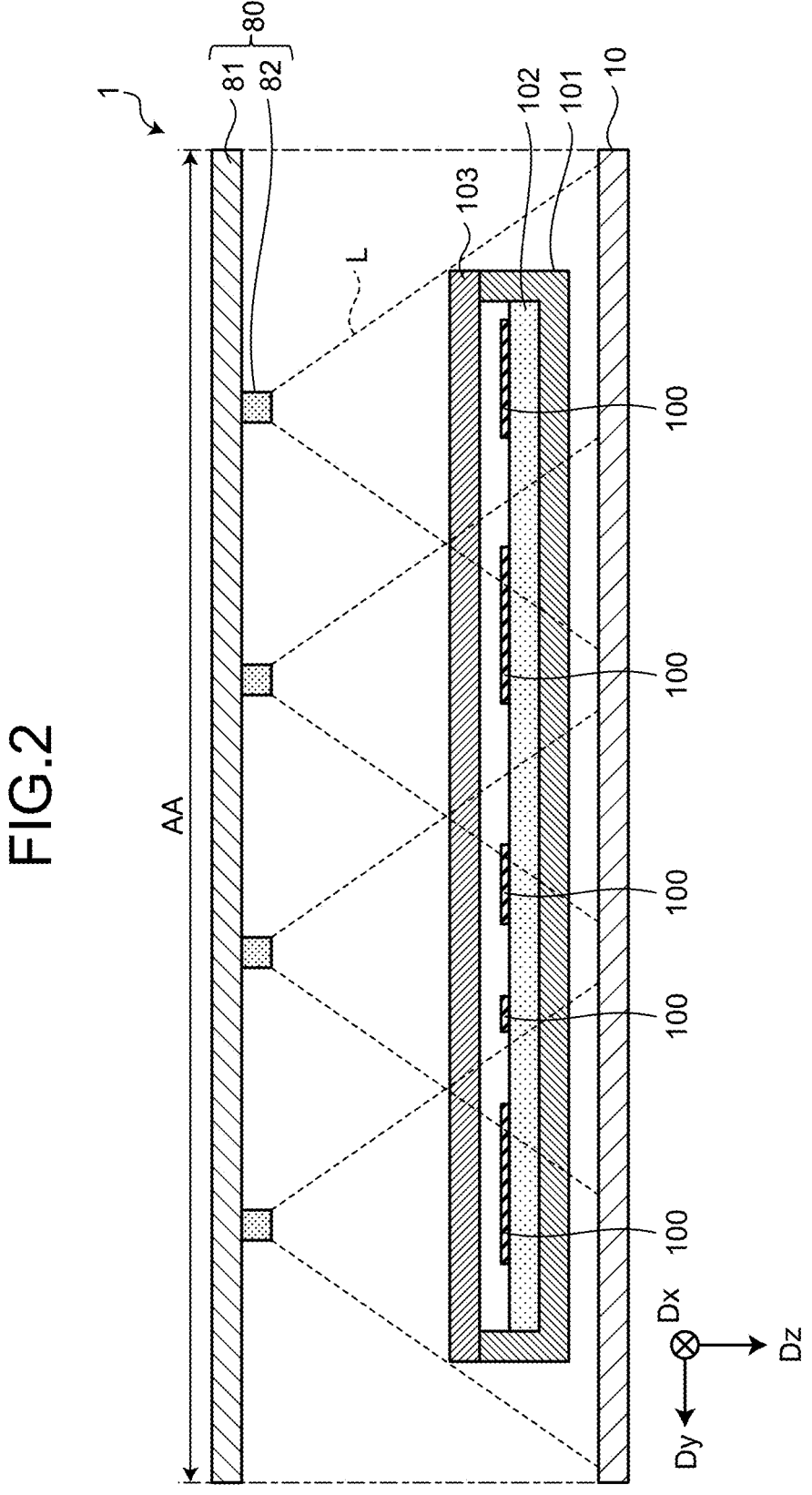
FIG. 2 is a schematic sectional view of the detection device according to the embodiment.

FIG. 1 is a plan view schematically illustrating a detection device according to an embodiment of the present disclosure. FIG. 2 is a schematic sectional view of the detection device according to the embodiment. In the present disclosure, a detection device 1 is what is called a biosensor that detects micro-objects such as bacteria as objects to be detected 100. The detection device 1 includes an optical sensor 10, a detection circuit 11, a control circuit 70, and a light source device 80.

The optical sensor 10 is a planar detection device that includes a plurality of photodiodes (photodetection elements) 30 arranged in a planar configuration. The optical sensor 10 is provided with a detection area AA that is provided with a plurality of sensor pixels 3 on an array substrate 2 formed using a substrate 21 as a base. In the present disclosure, the planar detection device includes the optical sensor 10, the detection circuit 11, and the control circuit 70.

A first direction Dx is one direction in a plane parallel to the substrate 21. A second direction Dy is one direction in the plane parallel to the substrate 21, and is a direction orthogonal to the first direction Dx. A third direction Dz is a direction orthogonal to the first direction Dx and the second direction Dy, and is a direction normal to a principle surface of the substrate 21. The term "plan view" refers to a positional relation when viewed from a direction orthogonal to the substrate 21.

The optical sensor 10 is the planar detection device that includes the photodiodes (photodetection elements) 30 arranged in the planar configuration. Specifically, the sensor pixels 3 are lined up in the first direction Dx and the second direction Dy, thus being arranged in a matrix having a row-column configuration. The sensor pixels 3 are not limited to being arranged in this manner, and may be arranged in a staggered manner in the detection area AA.

Each of the sensor pixels 3 is an optical sensor including a corresponding one of the photodiodes 30 as a photodetection element. Each of the photodiodes 30 outputs an electrical signal (potential) corresponding to light emitted thereto. More specifically, the photodiode 30 is an organic photodiode (OPD) using an organic semiconductor or a positive-intrinsic-negative (PIN) photodiode.

In the light source device 80, a light-emitting element 82 is provided on a light source substrate 81 that is provided so as to face the array substrate 2 of the optical sensor 10 in the third direction Dz. The light-emitting element 82 is configured as a light-emitting diode (LED), for example. FIG. 2 illustrates an aspect in which a plurality of the light-emitting elements 82 are provided in an area corresponding to the detection area AA of the optical sensor 10.

In the present disclosure, the detection device 1 includes a mounting substrate 101 on which the objects to be detected 100 are mounted, and a cover member 103. The mounting substrate 101 and the cover member 103 are light-transmitting plate-like members formed of glass, for example. Specifically, the mounting substrate 101 and the cover member 103 are a Petri dish, for example.

The objects to be detected 100 are cultured on a culture medium 102 provided on the mounting substrate 101. The objects to be detected 100 and the mounting substrate 101 are provided with the cover member 103 thereover, and placed between the optical sensor 10 and the light source device 80. More specifically, in the detection device 1, the mounting substrate 101 and the cover member 103 (objects to be detected 100), and the light source device 80 are arranged in this order above the optical sensor 10.

Light L emitted from the light-emitting elements 82 passes through the mounting substrate 101, the culture medium 102, and the cover member 103, and irradiates the detection area AA. The intensity of light received by the sensor pixels 3 (hereinafter, also referred to as "received light intensity") differs between areas overlapping the objects to be detected 100 and areas not overlapping the objects to be detected 100. The optical sensor 10 can capture an image of a colony (objects to be detected 100) on the culture medium 102 by differences in the received light intensity that differs among the sensor pixels 3.

A peripheral area GA outside the detection area AA of the substrate 21 is provided with first gate line drive circuits 15AA and 15AB, second gate line drive circuits 15BA and 15BB, and a signal line selection circuit 16.

The first gate line drive circuits 15AA and 15AB are arranged with the detection area AA interposed therebetween in the first direction Dx. The second gate line drive circuits 15BA and 15BB are arranged with the detection area AA interposed therebetween in the first direction Dx. The signal line selection circuit 16 is provided between the detection area AA and the detection circuit 11 along a side of the detection area AA that extends in the first direction Dx. The arrangements of the first gate line drive circuits 15AA and 15AB, the second gate line drive circuits 15BA and 15BB, and the signal line selection circuit 16 are not limited to these arrangements. Specifically, for example, an aspect may be employed in which the group of the first gate line drive circuits 15AA and 15AB and the group of the second gate line drive circuits 15BA and 15BB are configured as one first gate line drive circuit and one second gate line drive circuit, respectively, and the first gate line drive circuit and the second gate line drive circuit are arranged with the detection area AA interposed therebetween in the first direction Dx.

Figure 3:
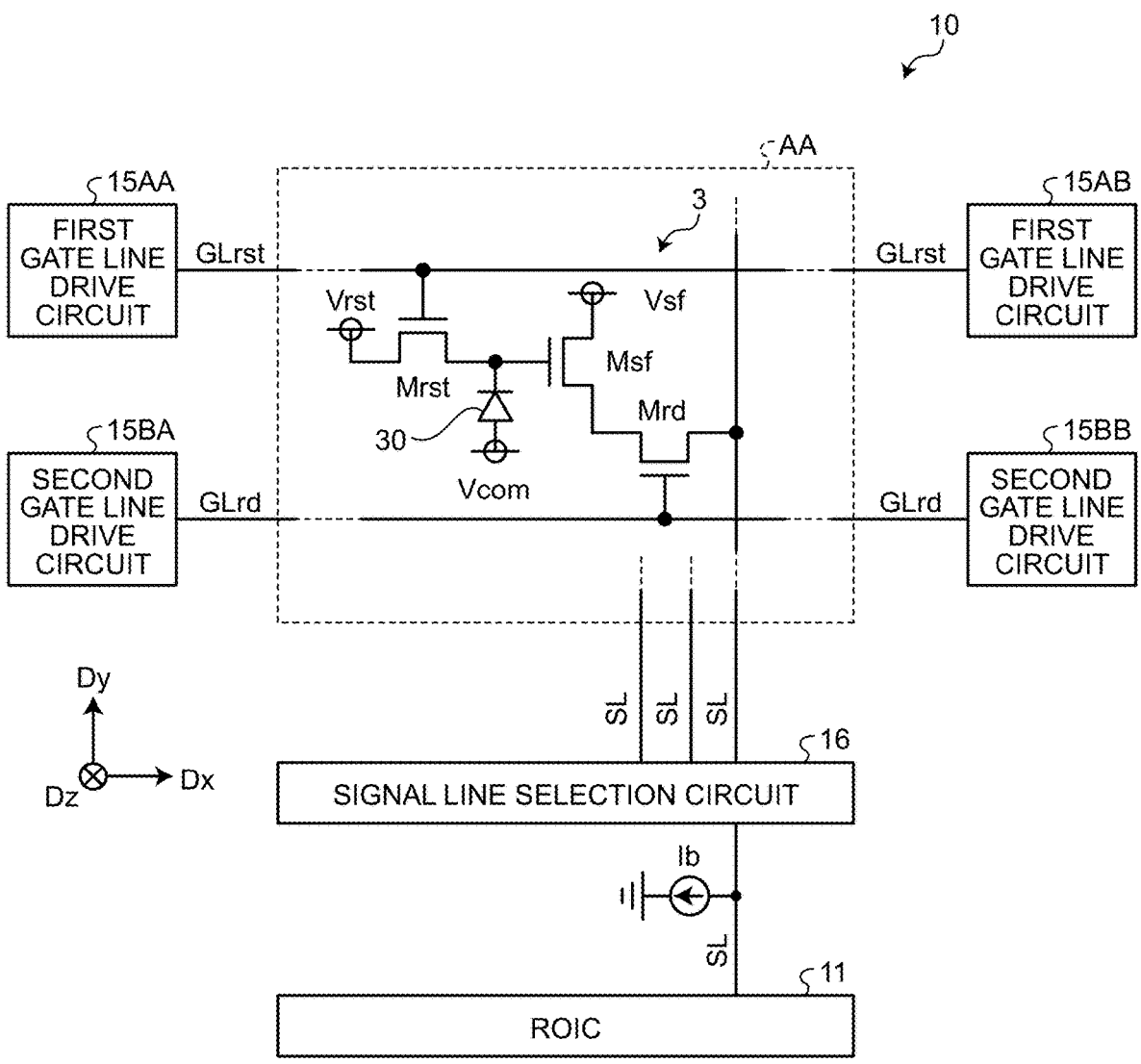
FIG. 3 is a circuit diagram illustrating an optical sensor according to the embodiment.

FIG. 3 is a circuit diagram illustrating the optical sensor according to the embodiment. As illustrated in FIG. 3, the sensor pixel 3 includes the photodiode 30, a reset transistor Mrst, a read transistor Mrd, and a source follower transistor Msf. The sensor pixel 3 is also provided with a first gate line (reset control scan line GLrst), a second gate line (read control scan line GLrd), and a signal line SL.

The first gate line (reset control scan line GLrst), the second gate line (read control scan line GLrd), and the signal line SL are each coupled to a plurality of the sensor pixels 3 in the detection area AA. Specifically, the first gate line (reset control scan line GLrst) and the second gate line (read control scan line GLrd) extend in the first direction Dx and are coupled to a plurality of the sensor pixels 3 arranged in the first direction Dx. The signal lines SL extend in the second direction Dy, and are each coupled to a plurality of the sensor pixels 3 arranged in the second direction Dy. The signal line SL is wiring through which signals from a plurality of transistors (read transistor Mrd and source follower transistor Msf) are output.

The reset transistor Mrst, the read transistor Mrd, and the source follower transistor Msf are provided correspondingly to one photodiode 30. The transistors included in the sensor pixel 3 are each configured as an n-type thin-film transistor (TFT). However, each of the transistors is not limited thereto, and may be configured as a p-type TFT.

A reference potential Vcom is applied to the anode of the photodiode 30. The cathode of the photodiode 30 is coupled to one of the source and the drain of the reset transistor Mrst and the gate of the source follower transistor Msf.

The gate of the reset transistor Mrst is coupled to the first gate line (reset control scan line GLrst). The other of the source and the drain of the reset transistor Mrst is supplied with a reset potential Vrst. Turning on the reset transistor Mrst (into a conducting state) resets the cathode potential of the photodiode 30 to the reset potential Vrst. The reference potential Vcom is lower than the reset potential Vrst, and the photodiode 30 is driven in a reverse-biased manner.

The source follower transistor Msf is coupled between a terminal supplied with a power supply potential Vsf and the read transistor Mrd. The gate of the source follower transistor Msf is coupled to the cathode of the photodiode 30. The gate of the source follower transistor Msf is supplied with a voltage corresponding to the received light intensity of the photodiode 30. As a result, the source follower transistor Msf outputs an electrical signal (potential) corresponding to the received light intensity of the photodiode 30 to the read transistor Mrd.

The read transistor Mrd is coupled between the source of the source follower transistor Msf and the signal line SL. The gate of the drive transistor Mrd is coupled to the second gate line (read control scan line GLrd). Turning on the read transistor Mrd outputs the signal output from the source follower transistor Msf, that is, the electrical signal (potential) corresponding to the received light intensity of the photodiode 30 as a detection signal Vdet to the output signal line SL.

In FIG. 3, the reset transistor Mrst and the read transistor Mrd each have a single-gate structure. However, the reset transistor Mrst and the read transistor Mrd may each have what is called a double-gate structure configured by coupling two transistors in series, or may have a configuration in which three or more transistors are coupled in series. The circuit of one sensor pixel 3 is not limited to the configuration including the three transistors of the reset transistor Mrst, the source follower transistor Msf, and the read transistor Mrd. The sensor pixel 3 may include two transistors or four or more transistors.

The first gate line drive circuits 15AA and 15AB are circuits that drive a plurality of the first gate lines (reset control scan lines GLrst) in the detection area AA. The first gate line drive circuits 15AA and 15AB are shift register circuits, for example.

In the present disclosure, the first gate line drive circuits 15AA and 15AB sequentially select the first gate lines (reset control scan lines GLrst) based on various control signals including, for example, start pulse signals STV and clock pulse signals supplied from the detection circuit 11, and supply first gate drive signals (reset control signals) to the selected the first gate lines (reset control scan lines GLrsto). In other words, the first gate line drive circuits 15AA and 15AB simultaneously supply the first gate drive signals (reset control signals) to the sensor pixels 3 arranged in the first direction Dx, and sequentially supply the first gate drive signals (reset control signals) to the sensor pixels 3 arranged in the second direction Dy. This operation resets the potentials of the photodiodes 30 of the sensor pixels 3 coupled to the first gate lines (reset control scan lines GLrsto) selected by the first gate line drive circuits 15AA and 15AB of the sensor pixels 3.

The second gate line drive circuits 15BA and 15BB are circuits that drive a plurality of the second gate lines (read control scan lines GLrd) in the detection area AA. The second gate line drive circuits 15BA and 15BB are shift register circuits, for example.

In the present disclosure, the second gate line drive circuits 15BA and 15BB sequentially select the second gate lines (read control scan lines GLrd) based on the various control signals including, for example, the start pulse signals STV and the clock pulse signals supplied from the detection circuit 11, and supply second gate drive signals (read control signals) to the selected second gate lines (read control scan lines GLrd). In other words, the second gate line drive circuits 15BA and 15BB simultaneously supply the second gate drive signals (read control signals) to the sensor pixels 3 arranged in the first direction Dx, and sequentially supply the second gate drive signals (read control signals) to the sensor pixels 3 arranged in the second direction Dy. This operation reads the electrical signals (potentials) of the sensor pixels 3 coupled to the second gate lines (read control scan lines GLrd) selected by the second gate line drive circuits 15BA and 15BB as the detection signals Vdet.

The signal line selection circuit 16 is a switch circuit that selects any one of the signal lines SL and couples it to the detection circuit 11. The signal line selection circuit 16 is a multiplexer, for example.

Figure 4:
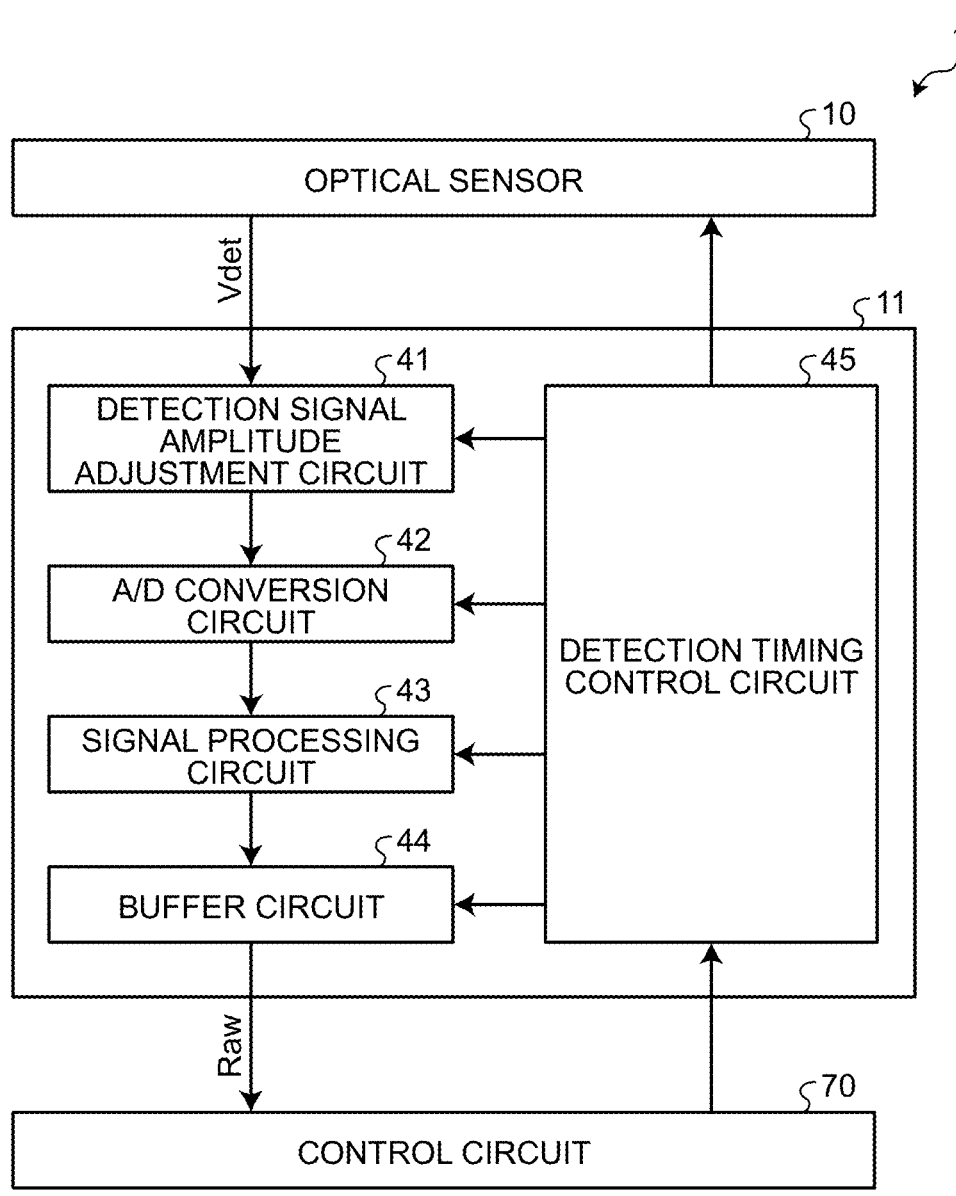
FIG. 4 is a block diagram illustrating a configuration example of a detection circuit according to the embodiment.

FIG. 4 is a block diagram illustrating a configuration example of the detection circuit according to the embodiment. The detection circuit 11 generates a sensor value Raw serving as a detection value of each of the sensor pixels 3 based on the detection signal Vdet output from the optical sensor 10. The detection circuit 11 is, for example, a readout integrated circuit (ROIC) that includes an analog front-end (AFE) circuit.

As illustrated in FIG. 4, the detection circuit 11 includes a detection signal amplitude adjustment circuit 41, an analog-to-digital (A/D) conversion circuit 42, a signal processing circuit 43, a buffer circuit 44, and a detection timing control circuit 45.

The detection signal amplitude adjustment circuit 41 is a circuit that adjusts the amplitude of the detection signal Vdet output from the optical sensor 10, and is configured with an amplifier, for example. The A/D conversion circuit 42 converts an analog signal output from the detection signal amplitude adjustment circuit 41 into a digital signal. The signal processing circuit 43 performs signal processing on the digital signal from the A/D conversion circuit 42 and stores the sensor value Raw for each of the sensor pixels 3 in the buffer circuit 44. More specifically, the signal processing circuit 43 sets the sensor value Raw for each of the sensor pixels 3 to the difference between the detection value acquired in a reset period of the sensor pixel 3 and the detection value acquired in a read period of the sensor pixel 3.

Based on various control signals supplied from the control circuit 70 (refer to FIG. 5), the detection timing control circuit 45 performs control to cause the detection signal amplitude adjustment circuit 41, the A/D conversion circuit 42, the signal processing circuit 43, and the buffer circuit 44 to operate in synchronization with one another. The sensor value Raw for each of the sensor pixels 3 stored in the buffer circuit 44 is transmitted to the control circuit 70 based on a read control signal from the control circuit 70.

The detection timing control circuit 45 is also a circuit that supplies respective control signals to the first gate line drive circuits 15AA and 15AB, the second gate line drive circuits 15BA and 15BB, and the signal line selection circuit 16 and controls operations of these circuits to perform a detection operation in the detection area AA. The detection timing control circuit 45 supplies the various control signals including, for example, the start pulse signals and the clock pulse signals to the first gate line drive circuits 15AA and 15AB and the second gate line drive circuits 15BA and 15BB. The detection timing control circuit 45 also supplies signal line selection signals to the signal line selection circuit 16.

Figure 5:
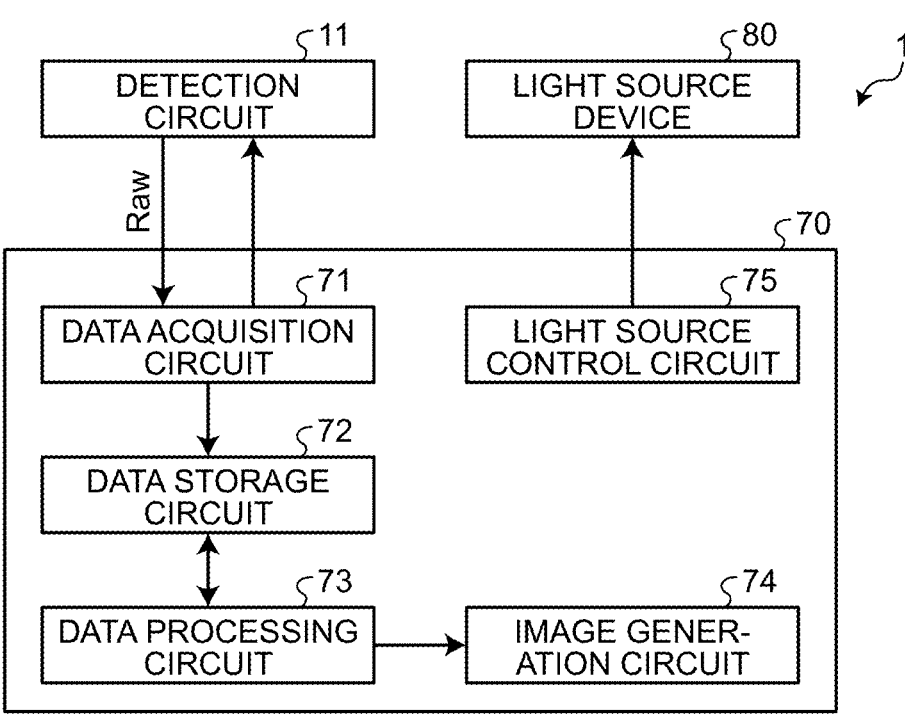
FIG. 5 is a block diagram illustrating a configuration example of a control circuit according to the embodiment.

FIG. 5 is a block diagram illustrating a configuration example of the control circuit according to the embodiment. The control circuit 70 synchronously controls the detection operation of the objects to be detected 100 in the detection circuit 11 and a lighting operation of the light-emitting elements 82 in the light source device 80. The control circuit 70 includes, for example, a micro-controller unit (MCU), a random-access memory (RAM), an electrically erasable programmable read-only memory (EEPROM), and a read-only memory (ROM).

Signal transmission among the control circuit 70, the detection circuit 11, and the light source device 80 is performed, for example, by a serial peripheral interface (SPI) that is a clock synchronization type serial interface. The present disclosure is not limited by the signal transmission method among the control circuit 70, the optical sensor 10, and the light source device 80.

As illustrated in FIG. 5, the control circuit 70 includes a data acquisition circuit 71, a data storage circuit 72, a data processing circuit 73, an image generation circuit 74, and a light source control circuit 75.

The data acquisition circuit 71 transmits the read control signal to the detection circuit 11, acquires the sensor value Raw for each of the sensor pixels 3, and stores it in the data storage circuit 72 in association with positional information on the sensor pixel 3 in the detection area AA. The data processing circuit 73 performs a correction process on the sensor value Raw of each of the sensor pixels 3 stored in the data storage circuit 72. The image generation circuit 74 generates a colony formation image on the culture medium 102 by binarizing the corrected values after the correction process.

The light source control circuit 75 controls the lighting operation of the light-emitting elements 82 in synchronization with the detection operation in the detection circuit 11. Specifically, when the light source device 80 is configured with a plurality of the light-emitting elements 82, the light source control circuit 75 stores information on lighting patterns of on (lit) and off (unlit) of the light-emitting elements 82, and transmits light emission control signals in accordance with the information on the lighting patterns to the light source device 80.

The intensity of the amount of light received by the sensor pixel 3 in the detection area AA (hereinafter, also referred to as "received light intensity") varies depending on the relative positional relation with the light-emitting element 82. Specifically, the received light intensity of the sensor pixel 3 located away from the light-emitting element 82 has a relatively smaller value than the received light intensity of the sensor pixel 3 located immediately below the light-emitting element 82.

Figure 6A:
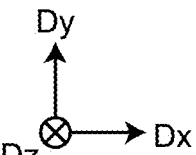
FIG. 6A is an illustrative diagram illustrating received light intensities in a detection area as a heat map.

FIG. 6A is an illustrative diagram illustrating the received light intensities in the detection area as a heat map. FIG. 6A illustrates a state in which one light-emitting element 82 is provided in a position on the light source substrate 81 corresponding to the center of the detection area AA, and illustrates an example in which a value obtained by normalizing the sensor value Raw(p) corresponding to the sensor pixel 3 in the detection area AA (p is an integer from 1 to P, where P is the total number of the sensor pixels 3 in the detection area AA (P=11×11=121 in the example illustrated in FIG. 6A)) by a maximum value Raw_max of the sensor value Raw in the detection area AA (for example, the sensor value of the sensor pixel located in the center of the detection area AA) is indicated as a received light intensity Li(p) of each of the sensor pixels 3. In this case, the received light intensity Li is larger in the center of the detection area AA, and the received light intensity Li becomes smaller at the periphery of the detection area AA.

The colony formation image can be considered to be generated by holding the reciprocal Raw(p)$^{-1}$ of the sensor value Raw(p) for each of the sensor pixels 3 acquired in the initial state in which the colony is not formed on the culture medium 102 as a correction coefficient Cf(p) for the sensor pixel 3 (Cf(p)=Raw(p)$_{-1}$), and applying a corrected value Cor(p) (=Raw(p)×Cf(p)) obtained by multiplying the sensor value Raw(p) by the correction coefficient Cf(p).

Figure 6B:
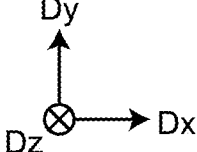
FIG. 6B is an illustrative diagram illustrating a correction coefficient for each sensor element as a heat map.

FIG. 6B is an illustrative diagram illustrating the correction coefficient for each of the sensor pixels as a heat map. The reciprocal of the received light intensity Li(p) (∝Raw(p)) of each of the sensor pixels 3 illustrated in FIG. 6A is illustrated as the correction coefficient Cf(p) for the sensor pixel 3 illustrated in FIG. 6B.

The sensor value of the sensor pixel 3 having a smaller received light intensity has a relatively larger ratio of system-derived noise components that are independent of the received light intensity. In addition, the correction coefficient that multiplies the sensor value of the sensor pixel 3 having a smaller received light intensity is relatively larger. Therefore, the system-derived noise components may be amplified to cause false detection.

The following describes a specific example of a detection process of an embodiment that can reduce the system-derived noise components in the detection device 1 having the configuration described above.

First Embodiment

Figure 7:
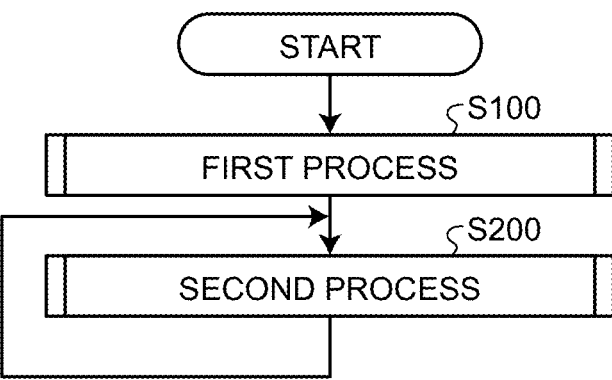
FIG. 7 is a flowchart illustrating a specific example of a detection process according to a first embodiment of the present disclosure.
Figure 8:
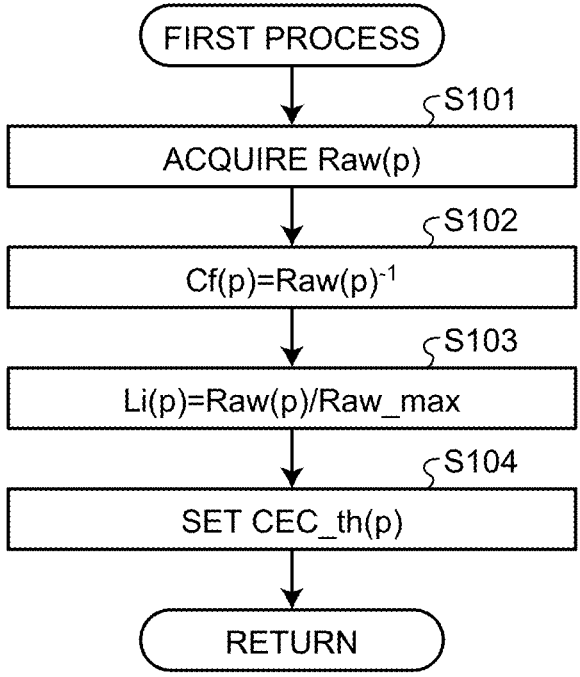
FIG. 8 is a sub-flowchart illustrating an example of a first process according to the first embodiment.
Figure 9A:
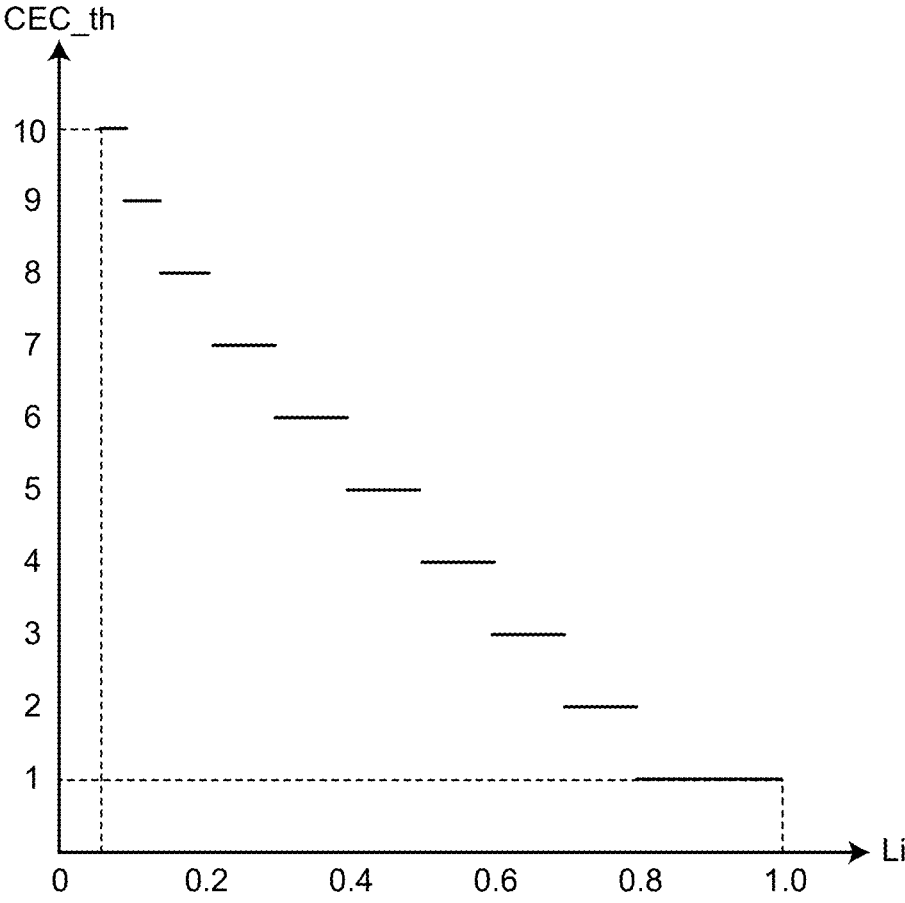
FIG. 9A is a diagram illustrating a relation between a received light intensity and a consecutive colony determination count threshold.
Figure 9B:
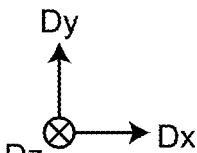
FIG. 9B is an illustrative diagram illustrating the consecutive colony determination count threshold for each sensor element as a heat map.
Figure 10:
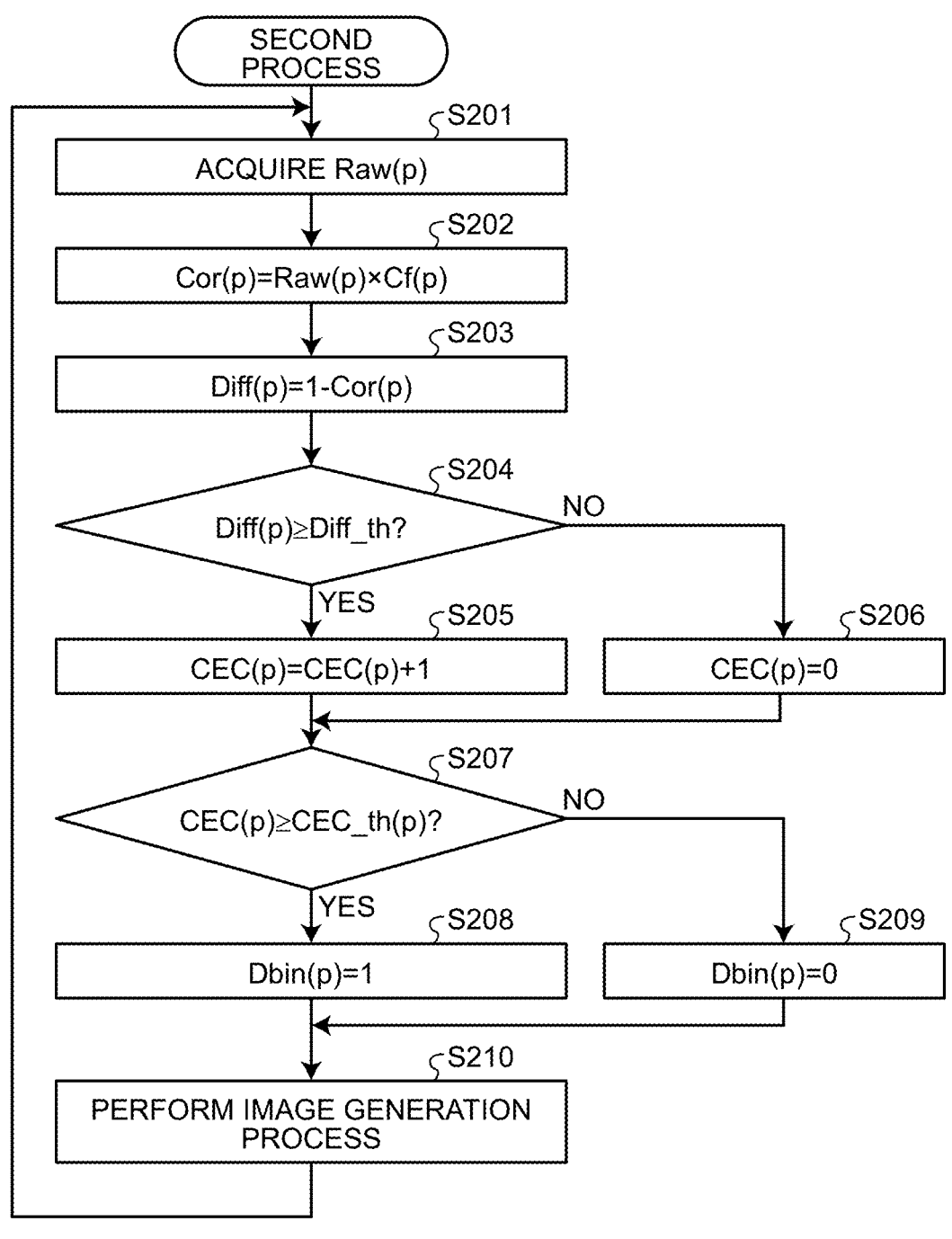
FIG. 10 is a sub-flowchart illustrating an example of a second process according to the first embodiment.

FIG. 7 is a flowchart illustrating a specific example of a detection process according to a first embodiment of the present disclosure. FIG. 8 is a sub-flowchart illustrating an example of a first process according to the first embodiment. FIG. 9A is a diagram illustrating a relation between the received light intensity and a consecutive colony determination count threshold. FIG. 9B is an illustrative diagram illustrating the consecutive colony determination count threshold for each sensor element as a heat map. FIG. 10 is a sub-flowchart illustrating an example of a second process according to the first embodiment.

In the first embodiment, an aspect will be described in which if a determination value (Diff(p) illustrated in FIG. 10) corresponding to a corrected value Cor(p) of the sensor pixel 3 has consecutively exceeded a determination threshold (Diff_th illustrated in FIG. 10) a plurality of times, a position on the culture medium 102 corresponding to the sensor pixel 3 is determined to be a colony, and effects of the system-derived noise components can be reduced by varying the consecutive colony determination count threshold (CEC_th illustrated in FIG. 9A) according to the received light intensity Li.

In the first embodiment, the relation between the received light intensity Li and the consecutive colony determination count threshold CEC_th illustrated in FIG. 9A is stored in advance, for example, as a conversion table in the data storage circuit 72. FIG. 9A illustrates an aspect in which the consecutive colony determination count threshold CEC_th is "1" for the sensor pixel 3 having the received light intensity Li in the range of "0.8 to 1", and the consecutive colony determination count threshold CEC_th is "10" for the sensor pixel 3 having the received light intensity Li of "0.6" illustrated in FIG. 6A (refer to FIG. 9B).

The optimal value of the consecutive colony determination count threshold CEC_th varies depending on the system-derived noise level and the range of the received light intensity Li in the detection area AA. Specifically, the consecutive colony determination count threshold CEC_th only needs to be set smaller for the sensor pixel 3 having the higher received light intensity Li and larger for the sensor pixel 3 having the lower received light intensity Li.

In the detection process illustrated in FIG. 7, the detection device 1 performs a process of acquiring the sensor value Raw at intervals of 5 minutes, for example. In other words, the sensor value acquiring period for one frame in the detection device 1 is 5 minutes (300 s), for example.

The first process (Step S100) illustrated in FIG. 7 is a process performed when no colony is formed on the culture medium 102. More specifically, in the first process, the correction coefficient and the consecutive colony determination count threshold for each of the sensor pixels 3 are set based on the sensor value acquired in the process of acquiring the sensor value for the first frame in the detection process according to the first embodiment.

In the first process illustrated in FIG. 8, the detection circuit 11 acquires the sensor value Raw(p) for each of the sensor pixels 3 (Step S101).

The data processing circuit 73 performs the process of calculating the reciprocal of the sensor value Raw(p) to calculate the correction coefficient Cf(p) for each of the sensor pixels 3 (Step S102).

The data processing circuit 73 subsequently calculates the received light intensity Li(p) of each of the sensor pixels 3 by normalizing the sensor value Raw(p) by the maximum value Raw_max of the sensor values Raw in the detection area AA (Li(p)=Raw(p)/Raw_max) (Step S103). The data processing circuit 73 then reads the consecutive colony determination count threshold CEC_th corresponding to the calculated received light intensity Li(p) from the conversion table illustrated in FIG. 9A, and sets the read consecutive colony determination count threshold CEC_th as the consecutive colony determination count threshold CEC_th(p) for each of the sensor pixels 3 (Step S104).

The second process (Step S200) illustrated in FIG. 7 is a process performed in a colony forming process. Specifically, in the second process, the correction coefficient Cf(p) for each of the sensor pixels 3 set by the first process and a consecutive colony determination count threshold CEC_th (p) are applied to the sensor values acquired in the processes of acquiring the sensor values for the second and subsequent frames after the first process illustrated in FIG. 8, and the colony formation image on the culture medium 102 is generated.

In the second process illustrated in FIG. 10, the detection circuit 11 acquires the sensor value Raw(p) for each of sensor pixels 3 (Step S201).

The data processing circuit 73 performs the correction process on the sensor value Raw(p) (Step S202). Specifically, the data processing circuit 73 calculates the corrected value Cor(p) for each of the sensor pixels 3 by multiplying the sensor value Raw(p) by the correction coefficient Cf(p).

The data processing circuit 73 subsequently subtracts the corrected value Cor(p) from 1 to calculate the determination value Diff(p) for each of the sensor pixels 3 (Step S203), and performs a threshold determination process between the determination value Diff(p) for each of the sensor pixels 3 and the determination threshold Diff_th (Step S204).

If the determination value Diff(p) is equal to or higher than the determination threshold Diff_th (Diff(p)≥Diff_th; Yes at Step S204), the data processing circuit 73 increments a consecutive colony determination count CEC(p) (CEC(p) =CEC(p)+1, at Step S205), and performs the threshold determination process between the consecutive colony determination count CEC(p) and the consecutive colony determination count threshold CEC_th(p) for each of the sensor pixels 3 (Step S207).

If the determination value Diff(p) is lower than the determination threshold Diff_th (Diff(p)<Diff_th; No at Step S204), the data processing circuit 73 resets the consecutive colony determination count CEC(p) (CEC(p)=0, at Step S206), and performs the threshold determination process between the consecutive colony determination count CEC (p) and the consecutive colony determination count threshold CEC_th(p) for each of the sensor pixels 3 (Step S207).

If the consecutive colony determination count CEC(p) is equal to or higher than the consecutive colony determination count threshold CEC_th(p) (CEC(p)≥CEC_th(p); Yes at Step S207), the data processing circuit 73 sets binarized data Dbin(p) for each of the sensor pixels 3 to "1" (Dbin(p)=1, at Step S208), and stores the set data in the data storage circuit 72.

If the consecutive colony determination count CEC(p) is lower than the consecutive colony determination count threshold CEC_th(p) (CEC(p)<CEC_th(p); No at Step S207), the data processing circuit 73 sets the binarized data Dbin(p) for each of the sensor pixels 3 to "0" (Dbin(p)=0, at Step S209), and stores the set data in the data storage circuit 72.

In the present embodiment, the determination threshold Diff_th is stored in the data storage circuit 72 in advance. Specifically, a determination value Diff_sat when the colony formation is saturated is set to "0.65", and the determination threshold Diff_th is set to "0.15", for example.

The image generation circuit 74 reads the binarized data Dbin(p) for each of the sensor pixels 3 stored in the data storage circuit 72, and generates a binarized colony formation image (Step S210).

After generating the colony formation image (Step S210), the detection device 1 returns the process to Step S201, and repeats the second process illustrated in FIG. 10. This processing allows the colony forming process on the culture medium 102 to be acquired as an image.

Figure 11:
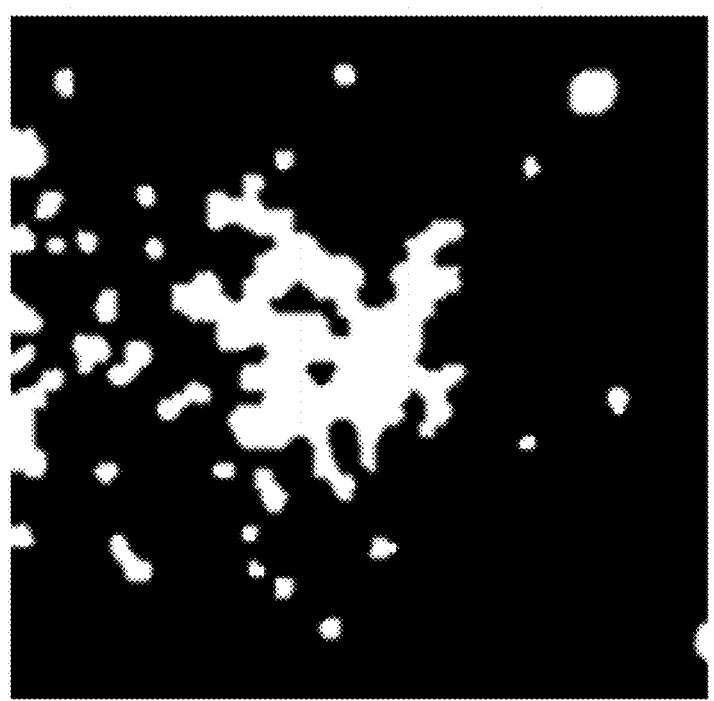
FIG. 11 is a view illustrating an example of a binarized colony formation image.

FIG. 11 is a view illustrating an example of the binarized colony formation image. FIG. 11 illustrates an example in which positions on the culture medium 102 corresponding to the sensor pixels 3 having the binarized data Dbin(p) of "1" are determined to be a colony.

Figure 12:
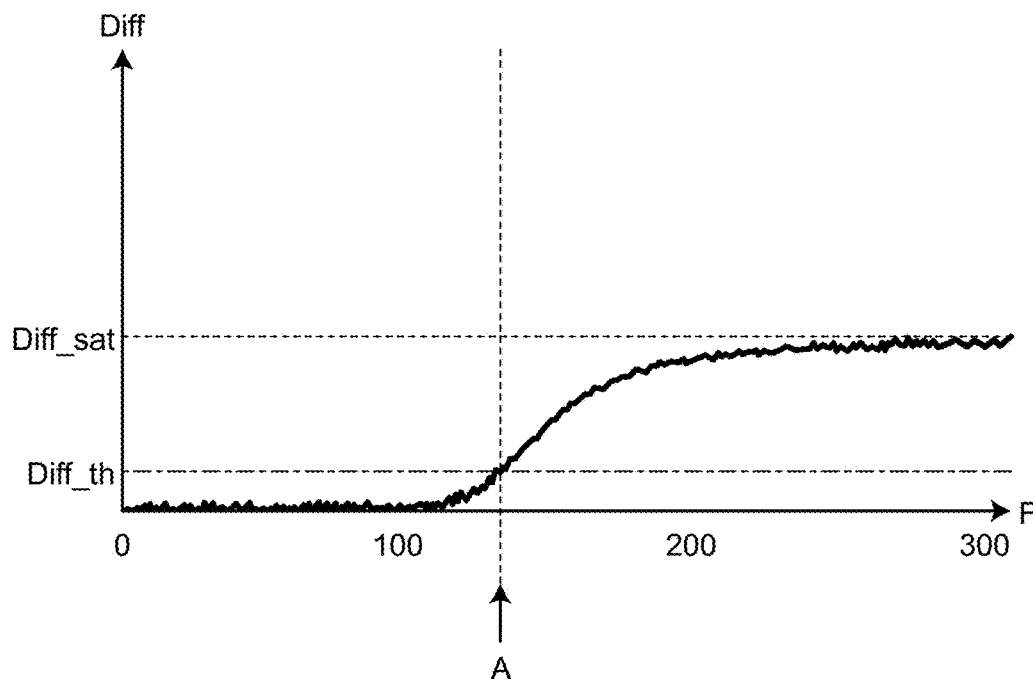
FIG. 12 is a diagram illustrating a first example of colony determination timing by the detection process according to the first embodiment.
Figure 13:
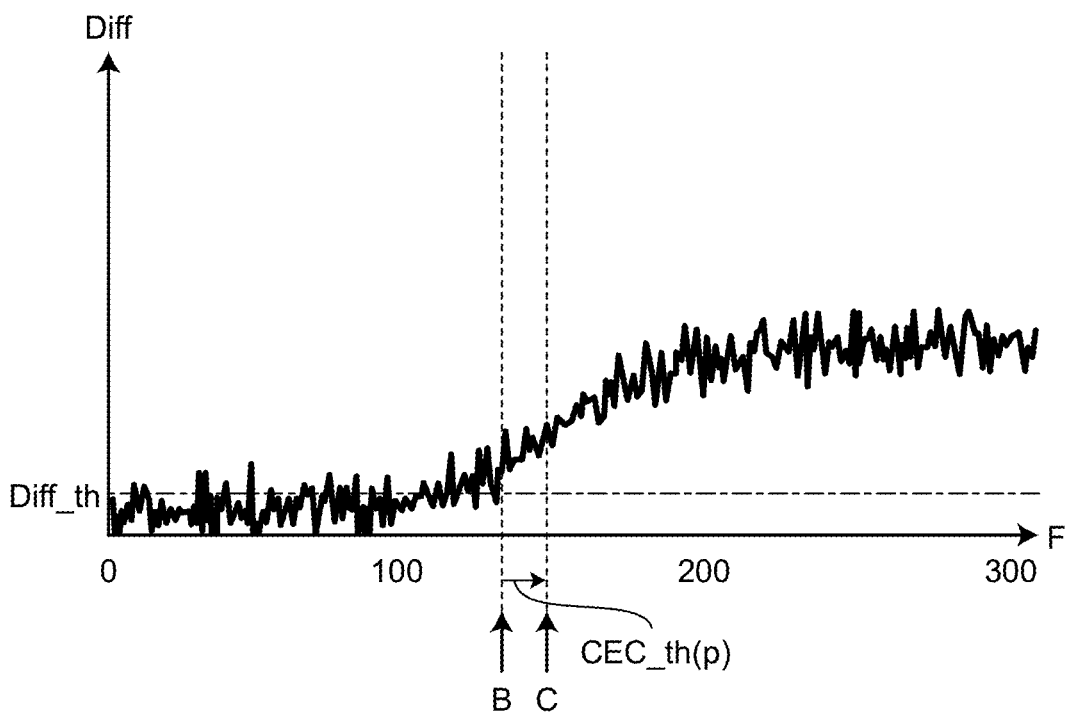
FIG. 13 is a diagram illustrating a second example of the colony determination timing by the detection process according to the first embodiment.

FIG. 12 is a diagram illustrating a first example of colony determination timing by the detection process according to the first embodiment. FIG. 13 is a diagram illustrating a second example of the colony determination timing by the detection process according to the first embodiment.

FIG. 12 illustrates a change in determination value in the sensor pixel 3 in the center of the detection area AA illustrated in FIG. 6A. FIG. 13 illustrates the change in determination value in the sensor pixel 3 at the periphery of the detection area AA illustrated in FIG. 6A.

In the sensor pixel 3 in the center of the detection area AA where the received light intensity Li is higher, the consecutive colony determination count threshold CEC_th(p) is set to "1". FIG. 12 illustrates an example in which the determination value Diff(p) is equal to or higher than the determination threshold Diff_th (Diff(p)≥Diff_th; Yes at Step S204) at a frame A, and further, the consecutive colony determination count CEC(p) is equal to or higher than the consecutive colony determination count threshold CEC_th (p) (CEC(p)≥CEC_th(p); Yes at Step S207).

The consecutive colony determination count threshold CEC_th(p) for the sensor pixel 3 at the periphery of the detection area AA where the received light intensity Li is lower is set to a value higher than the consecutive colony determination count threshold CEC_th(p) for the sensor pixel 3 in the center of the detection area AA (=1) where the received light intensity Li is higher. FIG. 12 illustrates an example in which the determination value Diff(p) is equal to or higher than the determination threshold Diff_th (Diff(p) ≥Diff_th; Yes at Step S204) at a frame B, and the determination value Diff(p) is equal to or higher than the determination threshold Diff_th (CEC(p)≥CEC_th(p); Yes at Step S207) consecutively from a frame B to a frame C.

The correction coefficient Cf(p) that multiplies the sensor value Raw(p) in the correction process at Step S202 becomes larger for the sensor pixel 3 at the periphery of the detection area AA where the received light intensity Li is lower. As a result, a larger amount of the system-derived noise components appears in the corrected value Cor(p) after the correction process. Therefore, if the consecutive colony determination count threshold CEC_th(p) is the same as that for the sensor pixel 3 in the center of the detection area AA (=1) where the received light intensity Li is higher, a position on the culture medium 102 corresponding to the sensor pixel 3 at the periphery of the detection area AA may be erroneously determined to be a colony.

In the detection process according to the first embodiment described above, by setting the appropriate consecutive colony determination count threshold CEC_th(p) according to the received light intensity Li, the system-derived noise components can be prevented from being erroneously determined to be a colony.

Second Embodiment

Figure 14:
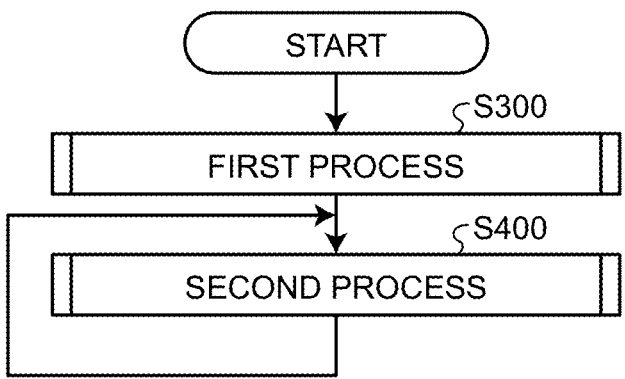
FIG. 14 is a flowchart illustrating a specific example of the detection process according to a second embodiment of the present disclosure.
Figure 15:
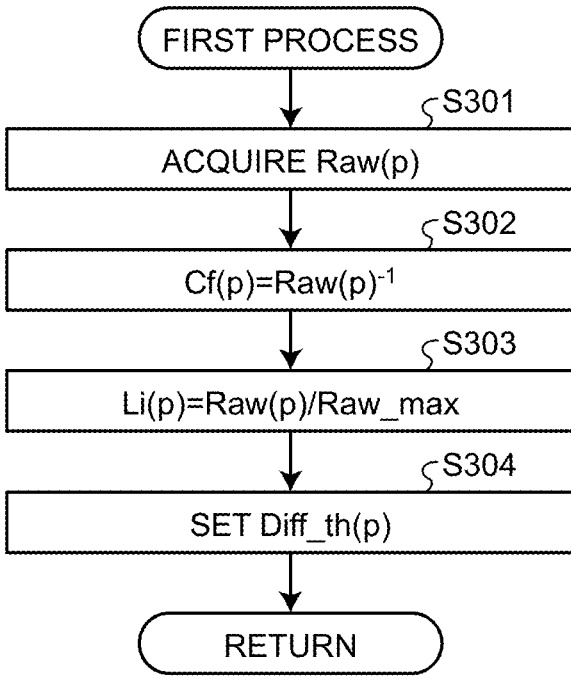
FIG. 15 is a sub-flowchart illustrating an example of the first process according to the second embodiment.
Figure 16A:
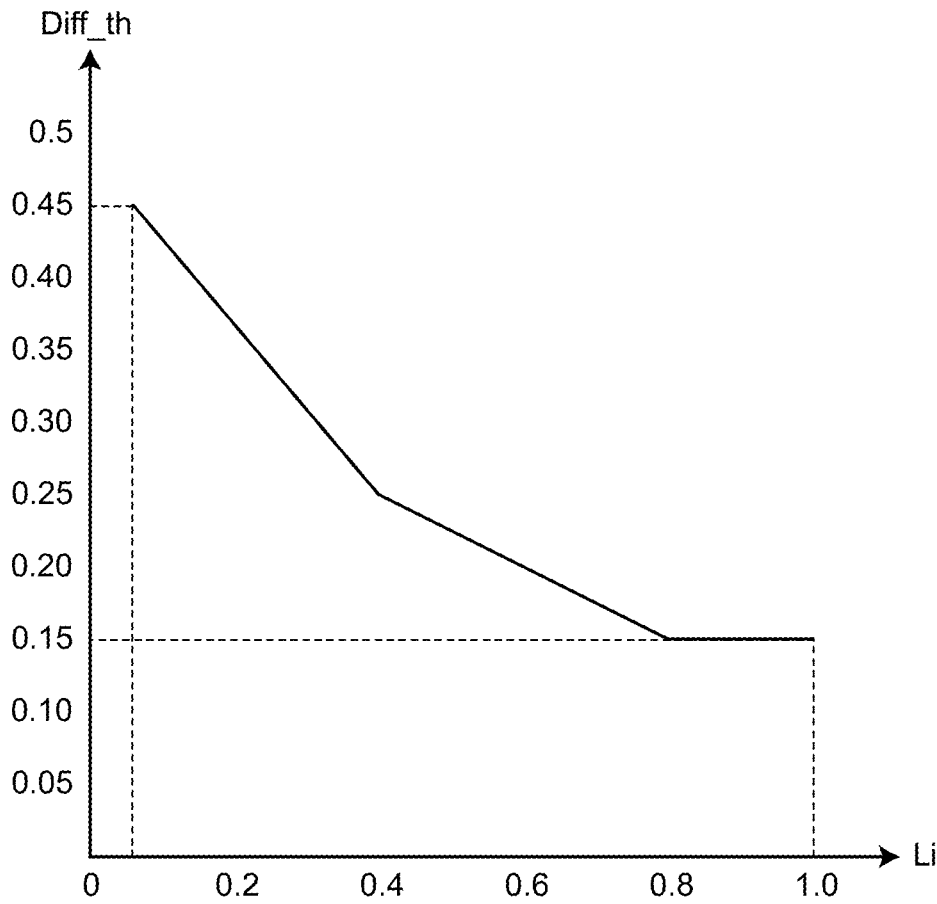
FIG. 16A is a diagram illustrating a relation between the received light intensity and a detection threshold.
Figure 16B:
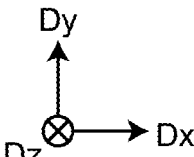
FIG. 16B is an illustrative diagram illustrating the detection threshold for each sensor element as a heat map.
Figure 17:
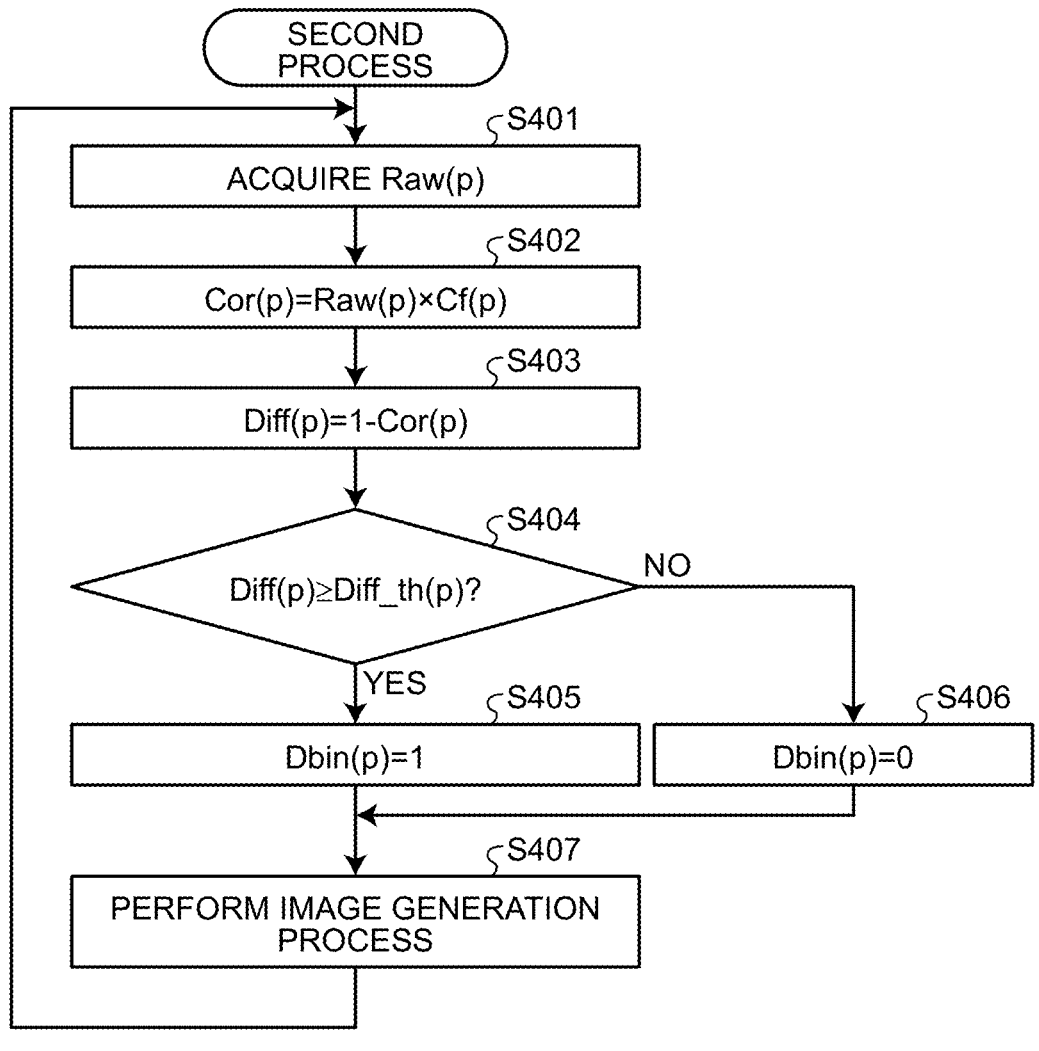
FIG. 17 is a sub-flowchart illustrating an example of the second process according to the second embodiment.

FIG. 14 is a flowchart illustrating a specific example of the detection process according to a second embodiment of the present disclosure. FIG. 15 is a sub-flowchart illustrating an example of the first process according to the second embodiment. FIG. 16A is a diagram illustrating a relation between the received light intensity and a detection threshold. FIG. 16B is an illustrative diagram illustrating the detection threshold for each sensor element as a heat map. FIG. 17 is a sub-flowchart illustrating an example of the second process according to the second embodiment.

In the second embodiment, an aspect will be described in which if the determination value (Diff(p) illustrated in FIG. 17) corresponding to the corrected value Cor(p) of the sensor pixel 3 has exceeded the determination threshold (Diff_th(p) illustrated in FIG. 17) set for each of the sensor pixels 3, a position on the culture medium 102 corresponding to the sensor pixel 3 is determined to be a colony, and the effects of the system-derived noise components can be reduced by varying the determination threshold (Diff_th illustrated in FIG. 16A) according to the received light intensity Li.

In the second embodiment, the relation between the received light intensity Li and the determination threshold Diff_th illustrated in FIG. 16A is stored in advance, for example, as a conversion table in the data storage circuit 72. FIG. 16A illustrates an aspect in which the determination threshold Diff_th is "0.15" for the sensor pixel 3 having the received light intensity Li in the range of "0.8 to 1", and the determination threshold Diff_th is "0.45" for the sensor pixel 3 having the received light intensity Li of "0.6" illustrated in FIG. 6A (refer to FIG. 16B).

The optimal value of the determination threshold Diff_th varies depending on the system-derived noise level and the range of the received light intensity Li in the detection area AA. Specifically, the determination threshold Diff_th only needs to be set lower for the sensor pixel 3 having the higher received light intensity Li and higher for the sensor pixel 3 having the lower received light intensity Li.

In the detection process illustrated in FIG. 14, the detection device 1 performs the process of acquiring the sensor value Raw at intervals of 5 minutes, for example. In other words, the sensor value acquiring period for one frame in the detection device 1 is 5 minutes (300 s), for example.

The first process (Step S300) illustrated in FIG. 14 is a process performed when no colony is formed on the culture medium 102. More specifically, in the first process, the correction coefficient and the consecutive colony determination count threshold for each of the sensor pixels 3 are set based on the sensor value acquired in the process of acquiring the sensor value for the first frame in the detection process according to the second embodiment.

In the first process illustrated in FIG. 15, the detection circuit 11 acquires the sensor value Raw(p) for each of the sensor pixels 3 (Step S301).

The data processing circuit 73 performs the process of calculating the reciprocal of the sensor value Raw(p) to calculate the correction coefficient Cf(p) for each of the sensor pixels 3 (Step S302).

The data processing circuit 73 subsequently calculates the received light intensity Li(p) of each of the sensor pixels 3 by normalizing the sensor value Raw(p) by the maximum value Raw_max of the sensor values Raw in the detection area AA (Li(p)=Raw(p)/Raw_max) (Step S303). The data processing circuit 73 then reads the determination threshold Diff_th corresponding to the calculated received light intensity Li(p) from the conversion table illustrated in FIG. 16A, and sets the read determination threshold Diff_th as the determination threshold Diff_th(p) for each of the sensor pixels 3 (Step S304).

The second process (Step S400) illustrated in FIG. 14 is a process performed in the colony forming process. Specifically, in the second process, the correction coefficient Cf(p) and the determination threshold Diff_th(p) for each of the sensor pixels 3 set by the first process are applied to the sensor values acquired in the processes of acquiring the sensor values for the second and subsequent frames after the first process illustrated in FIG. 15, and the colony formation image on the culture medium 102 is generated.

In the second process illustrated in FIG. 17, the detection circuit 11 acquires the sensor value Raw(p) for each of the sensor pixels 3 (Step S401).

The data processing circuit 73 performs the correction process on the sensor value Raw(p) (Step S402). Specifically, the data processing circuit 73 calculates the corrected value Cor(p) for each of the sensor pixels 3 by multiplying the sensor value Raw(p) by the correction coefficient Cf(p).

The data processing circuit 73 subsequently subtracts the corrected value Cor(p) from 1 to calculate the determination value Diff(p) for each of the sensor pixels 3 (Step S403), and performs the threshold determination process between the determination value Diff(p) for each of the sensor pixels 3 and the determination threshold Diff_th(p) for each of the sensor pixels 3 (Step S404).

If the determination value Diff(p) is equal to or higher than the determination threshold Diff_th(p) (Diff(p)≥Diff_th (p); Yes at Step S404), the data processing circuit 73 sets the binarized data Dbin(p) for each of the sensor pixels 3 to "1" (Dbin(p)=1, at Step S405), and stores the set data in the data storage circuit 72.

If the determination value Diff(p) is lower than the determination threshold Diff_th(p) (Diff(p)<Diff_th; No at Step S404), the data processing circuit 73 sets the binarized data Dbin(p) for each of the sensor pixels 3 to "0" (Dbin (p)=0, at Step S406), and stores the set data in the data storage circuit 72.

The image generation circuit 74 reads the binarized data Dbin(p) for each of the sensor pixels 3 stored in the data storage circuit 72, and generates the binarized colony formation image (Step S407).

After generating the colony formation image (Step S407), the detection device 1 returns the process to Step S401, and repeats the second process illustrated in FIG. 16. This processing allows the colony forming process on the culture medium 102 to be acquired as an image.

Figure 18:
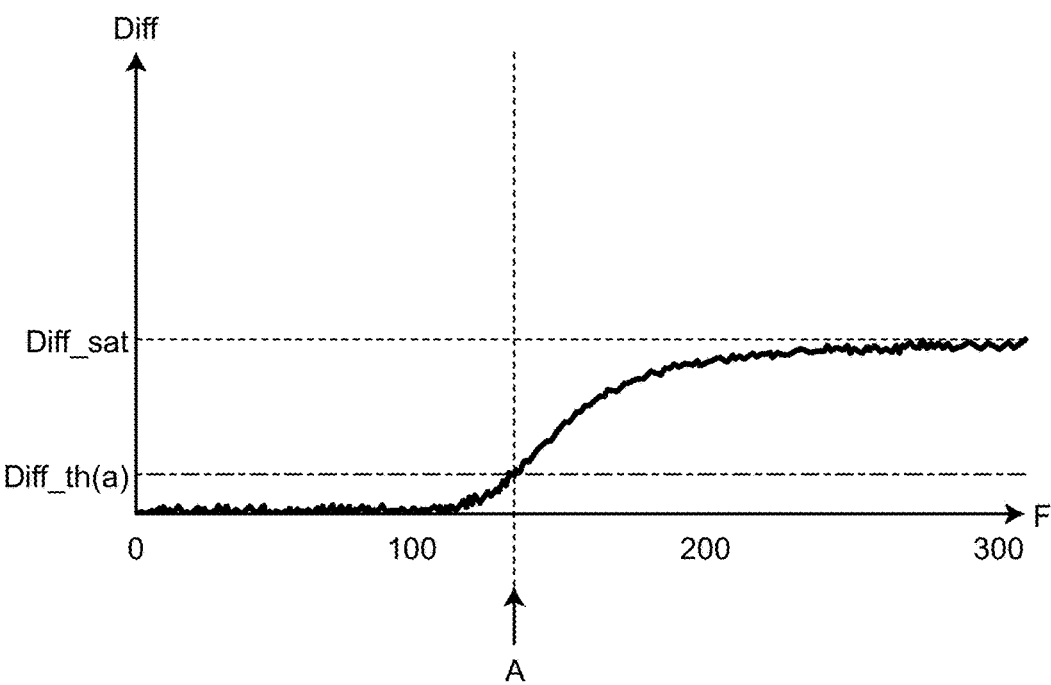
FIG. 18 is a diagram illustrating a first example of the colony determination timing by the detection process according to the second embodiment.
Figure 19:
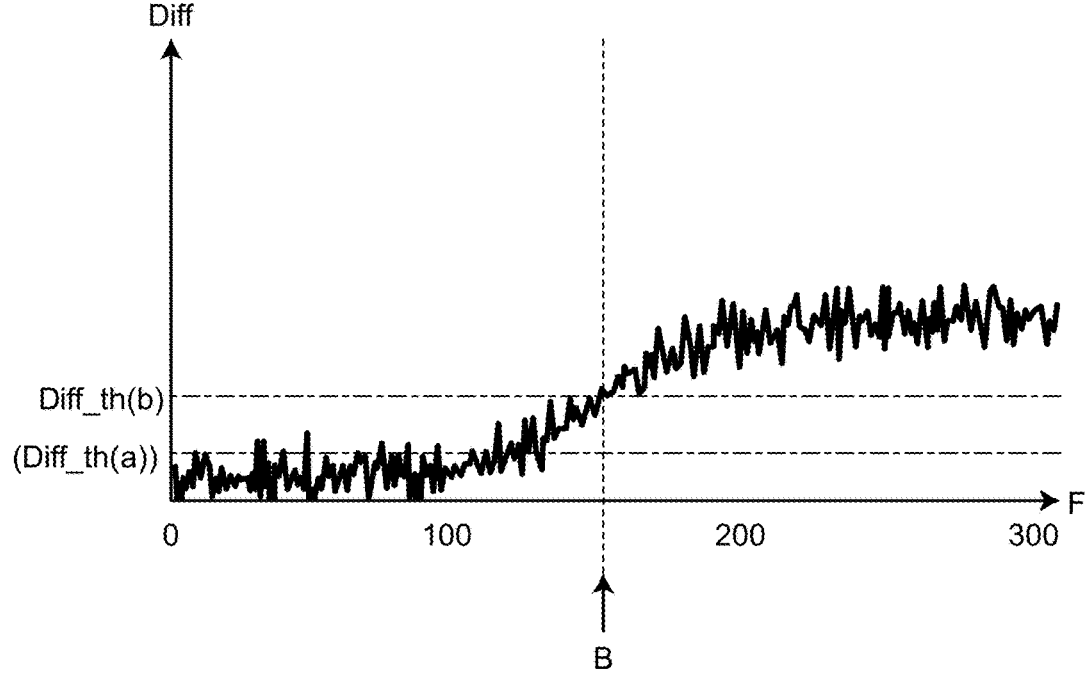
FIG. 19 is a diagram illustrating a second example of the colony determination timing by the detection process according to the second embodiment.

FIG. 18 is a diagram illustrating a first example of the colony determination timing by the detection process according to the second embodiment. FIG. 19 is a diagram illustrating a second example of the colony determination timing by the detection process according to the second embodiment.

FIG. 18 illustrates a change in determination value in the sensor pixel 3 in the center of the detection area AA illustrated in FIG. 6A. FIG. 19 illustrates the change in determination value in the sensor pixel 3 at the periphery of the detection area AA illustrated in FIG. 6A.

In the sensor pixel 3 in the center of the detection area AA where the received light intensity Li is higher, the determination threshold is set to "0.15" (Diff_th(a)=0.15). FIG. 18 illustrates an example in which the determination value is equal to or higher than the determination threshold (=Diff_th (a)) at the frame A.

As illustrated in FIG. 19, the determination threshold Diff_th(b) for the sensor pixel 3 at the periphery of the detection area AA where the received light intensity Li is lower is set to a value higher than the determination threshold Diff_th(a) for the sensor pixel 3 in the center of the detection area AA where the received light intensity Li is higher. FIG. 19 illustrates an example in which the determination value is equal to or higher than the determination threshold (=Diff_th(b)) at the frame B.

The correction coefficient Cf(p) that multiplies the sensor value Raw(p) in the correction process at Step S202 becomes larger for the sensor pixel 3 at the periphery of the detection area AA where the received light intensity Li is lower. As a result, a larger amount of the system-derived noise components appears in the corrected value Cor(p) after the correction process. Therefore, as illustrated in FIG. 19, if the determination threshold is the same as that for the sensor pixel 3 in the center of the detection area AA (=Diff_th(a)) where the received light intensity Li is higher, a position on the culture medium 102 corresponding to the sensor pixel 3 at the periphery of the detection area AA may be erroneously determined to be a colony.

In the detection process according to the second embodiment, as described above, the determination threshold Diff_th(b) for the sensor pixel 3 at the periphery of the detection area AA where the received light intensity Li is lower is set higher than the determination threshold Diff_th(a) for the sensor pixel 3 in the center of the detection area AA where the received light intensity Li is higher. The difference between the determination threshold Diff_th(b) and the determination threshold Diff_th(a) is set equal to or larger than the difference between the peak value of the system-derived noise components superimposed on the determination value Diff(b) for the sensor pixel 3 at the periphery of the detection area AA where the received light intensity Li is lower and the peak value of the system-derived noise components superimposed on the determination value Diff (a) for the sensor pixel 3 in the center of the detection area AA where the received light intensity Li is higher. In other words, the determination threshold Diff_th(p) is set to a value higher than the peak value of noise assumed at the received light intensity Li. Alternatively, the determination threshold Diff_th(p) is set to a value increased by an amount of noise assumed at the received light intensity Li. As a result, the system-derived noise components can be restrained from causing the erroneous determination before a colony is generated. Thus, by setting the appropriate determination threshold Diff_th(p) according to the received light intensity Li, the system-derived noise components can be prevented from being erroneously determined to be a colony.

The first embodiment and the second embodiment can be combined together. Specifically, an aspect may be employed in which, as the determination threshold in the first embodiment, the consecutive colony determination count threshold CEC_th(p) and the determination threshold Diff_th(p) are set according to the received light intensity Li(p) for each of the sensor pixels 3, and if the consecutive colony determination count CEC(p) of events where the determination value Diff(p) is equal to or higher than the determination threshold Diff_th(p) is equal to or larger than the consecutive colony determination count threshold CEC_th(p), a colony is determined to be generated.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure. At least one of various omissions, substitutions, and changes of the components can be made without departing from the gist of the embodiments described above.

What is claimed is:

1. A detection device comprising:
a planar detection device comprising a plurality of photodetection elements arranged in a planar configuration;
a light source device disposed so as to face the planar detection device; and
a light-transmitting mounting substrate that is disposed between the planar detection device and the light source device and configured to mount a plurality of objects to be detected, wherein
the planar detection device comprises:
a detection area in which a plurality of sensor pixels comprising the photodetection elements are arranged in a first direction and a second direction orthogonal to the first direction;
a detection circuit configured to acquire a sensor value of each of the sensor pixels; and
a control circuit configured to determine that an object to be detected is present in a position on the detection area corresponding to the sensor pixel, when a value calculated based on the sensor value is consecutively equal to or higher than a determination threshold a number of time, and the number of times is equal to or higher than a consecutive determination count threshold that has been set according to a received light intensity for each of the sensor pixels.

2. The detection device according to claim 1, wherein the control circuit is configured to calculate a corrected value for each of the sensor pixels by multiplying the sensor value of each of the sensor pixels by a correction coefficient according to the received light intensity of the sensor pixel, and determine, based on the corrected value, whether the object to be detected is present in the position on the detection area corresponding to the sensor pixel.

3. The detection device according to claim 2, wherein the control circuit is configured to determine that the object to be detected is present in the position on the detection area corresponding to the sensor pixel, when a value obtained by subtracting a reference value for each of the sensor pixels from the corrected value is consecutively equal to or higher than the determination threshold a number of time, and the number of times is equal to or higher than the consecutive determination count threshold.

4. The detection device according to claim 2, wherein the control circuit is configured to determine that the object to be detected is present in the position on the detection area corresponding to the sensor pixel, when a value obtained by subtracting a reference value for each of the sensor pixels from the corrected value is equal to or higher than the determination threshold.

5. The detection device according to claim 1, wherein the consecutive determination count threshold is set for each of the sensor pixels.

6. The detection device according to claim 5, wherein the consecutive determination count threshold is lower for the sensor pixel having the higher received light intensity and higher for the sensor pixel having the lower received light intensity.

7. The detection device according to claim 6, wherein the control circuit comprises:
a first process to set a correction coefficient, the consecutive determination count threshold, and a reference value for each of the pixels; and
a second process to generate an image in the detection area.

8. The detection device according to claim 7, wherein the control circuit is configured to set the correction coefficient to a reciprocal of the sensor value of each of the sensor pixels acquired in the first process.

9. The detection device according to claim 7, wherein the control circuit is configured to calculate the reference value by multiplying the sensor value of each of the sensor pixels acquired in the first process by the correction coefficient for each of the sensor pixels.

10. The detection device according to claim 7, wherein the control circuit is configured to normalize the sensor value of each of the sensor pixels acquired in the first process to calculate the received light intensity for each of the sensor pixels.

11. A detection device comprising:
a planar detection device comprising a plurality of photodetection elements arranged in a planar configuration;
a light source device disposed so as to face the planar detection device; and
a light-transmitting mounting substrate that is disposed between the planar detection device and the light source device and configured to mount a plurality of objects to be detected, wherein the planar detection device comprises:
a detection area in which a plurality of sensor pixels comprising the photodetection elements are arranged in a first direction and a second direction orthogonal to the first direction;
a detection circuit configured to acquire a sensor value of each of the sensor pixels; and
a control circuit configured to, when a value calculated based on the sensor value is equal to or higher than a determination threshold that has been set according to a received light intensity for each of the sensor pixels, determine that an object to be detected is present in a position on the detection area corresponding to the sensor pixel,
the determination threshold is set for each of the sensor pixels, and
the determination threshold is lower for the sensor pixel having the higher received light intensity and higher for the sensor pixel having the lower received light intensity.

12. The detection device according to claim 11, wherein the control circuit is configured to calculate a corrected value for each of the sensor pixels by multiplying the sensor value for each of the sensor pixels by a correction coefficient according to the received light intensity of the sensor pixel, and determine, based on the corrected value, whether an object to be detected is present in the position on the detection area corresponding to the sensor pixel.

13. The detection device according to claim 11, wherein the control circuit comprises:

a first process to set a correction coefficient, the determination threshold, and a reference value for each of the pixels; and a second process to generate an image in the detection area.

14. The detection device according to claim 13, wherein the control circuit is configured to set the correction coefficient to a reciprocal of the sensor value of each of the sensor pixels acquired in the first process.

15. The detection device according to claim 13, wherein the control circuit is configured to calculate the reference value by multiplying the sensor value of each of the sensor pixels acquired in the first process by the correction coefficient for each of the sensor pixels.

16. The detection device according to claim 13, wherein the control circuit is configured to normalize the sensor value of each of the sensor pixels acquired in the first process to calculate the received light intensity for each of the sensor pixels.

* * * * *